United States Patent [19]

Anderson et al.

[11] E Re. 31,328

[45] Reissued Aug. 2, 1983

[54] REFRIGERATION INSULATION PANEL AND STRUCTURE

[76] Inventors: Arnold N. Anderson, 6 Wyoming Dr.; Gerard Crennan, 1 Indian Hill Ct., both of Hazlet, N.J. 07730

[21] Appl. No.: 229,445

[22] Filed: Jan. 29, 1981

Related U.S. Patent Documents

Reissue of:

[64] Patent No.: 4,218,104
Issued: Aug. 19, 1980
Appl. No.: 12,960
Filed: Feb. 16, 1970

[51] Int. Cl.[3] ..... E01F 13/00; E04C 2/00; F25D 11/00

[52] U.S. Cl. ..... 160/354; 160/330; 312/214; 52/63; 49/9

[58] Field of Search ..... 312/214, 259, 137; 49/34, 9; 160/354, 330; 52/63

[56] References Cited

U.S. PATENT DOCUMENTS

| | | | |
|---|---|---|---|
| 2,279,572 | 4/1942 | Kann | 49/34 |
| 2,760,567 | 8/1956 | Eckel et al. | 160/354 |
| 3,146,826 | 9/1964 | Eckel | 160/354 |
| 3,146,827 | 9/1964 | Eckel | 160/354 |
| 3,212,561 | 10/1965 | Eckel | 160/354 |
| 3,310,453 | 3/1967 | Lappala et al. | 52/63 |
| 3,420,290 | 1/1969 | Dirubbo | 160/354 |
| 3,473,272 | 10/1969 | Hasselquist | 52/63 |
| 3,750,739 | 8/1973 | McGuire | 160/354 |
| 3,797,165 | 3/1974 | Kochis | 49/9 |
| 3,811,222 | 5/1974 | Economou | 49/9 |
| 3,854,263 | 12/1974 | Eckel | 160/354 |
| 3,858,357 | 1/1975 | McGuire | 160/354 |
| 3,979,872 | 9/1976 | Gilchrist et al. | 160/354 |
| 4,102,353 | 7/1978 | Pugliese | 52/63 |
| 4,141,611 | 2/1979 | DeLeon | 160/330 |

*Primary Examiner*—Victor N. Sakran
*Attorney, Agent, or Firm*—William T. Hough

[57] ABSTRACT

In a preferred embodiment of the invention, there is provided an air-lock tunnel composed of side and top panels forming a tunnel and swing-hinge-mounted panel doors at each of opposite ends of the tunnel, all panels being refrigeration insulation flexible panels, of which the panel doors are typical in general structure, each panel door being closed-cell rubber sheet sandwiched between sandwiching Nylon sheets each surface-coated with a rubber layer and each rubber-coated Nylon sheet being flexible, having a lower half of the exposed (exterior) surfce of the sandwiching flexible sheets covered by an attached bumper or kick guard sheet of thick Nylon fabric having a polyvinylchloride composition plastic coating and having a cut-out groove spaced-from and following the curcumscribing edge thereof in which twisted Nylon thread follows and is recessed within the cut-out groove in the sewn attachment of the bumper sheet to the exposed surface of the flexible sheet, the door having the sandwiching fabric sheets extending beyond the edges of the sandwiched rubber, with the free edges of the sandwiching sheets turned-under and sewn-together as four layers thereby increasing strength thereof and forming a channel receivable of an upper-end support bar and a hinge-side support bar, the upper and side bars being upright and horizontal legs of a right-angle bar of which the upright bar extends through a spring-biased hinge mechanism for centering the door in a closed position normally, the hinge mechanism and structure being mounted on an upright bar which is a part of a u-shaped support structure mounted on a side wall above a door and serving to extend through fabric loops of the panel structures thereby supporting the panel roof and opposite sides of the tunnel.

30 Claims, 9 Drawing Figures

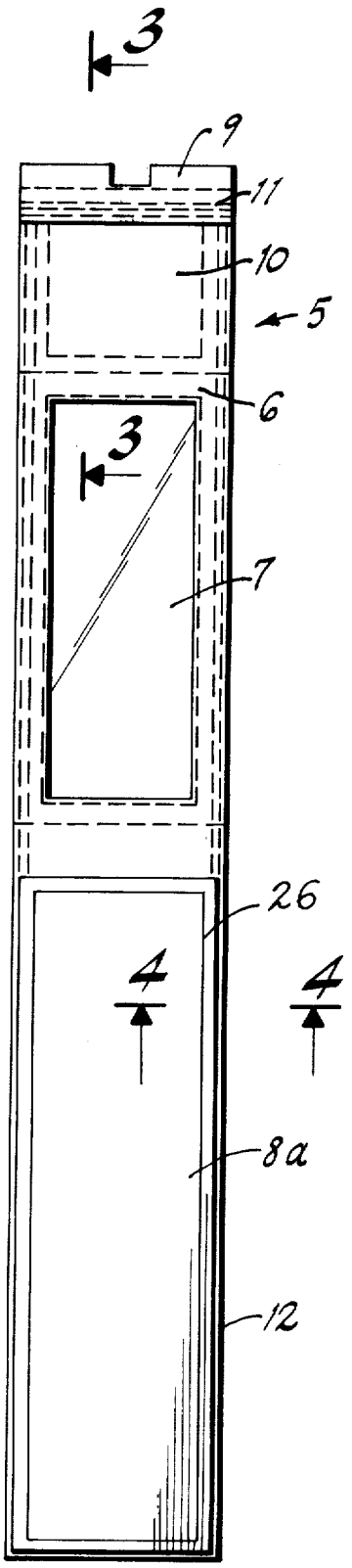
FIG. 1
FIG. 3
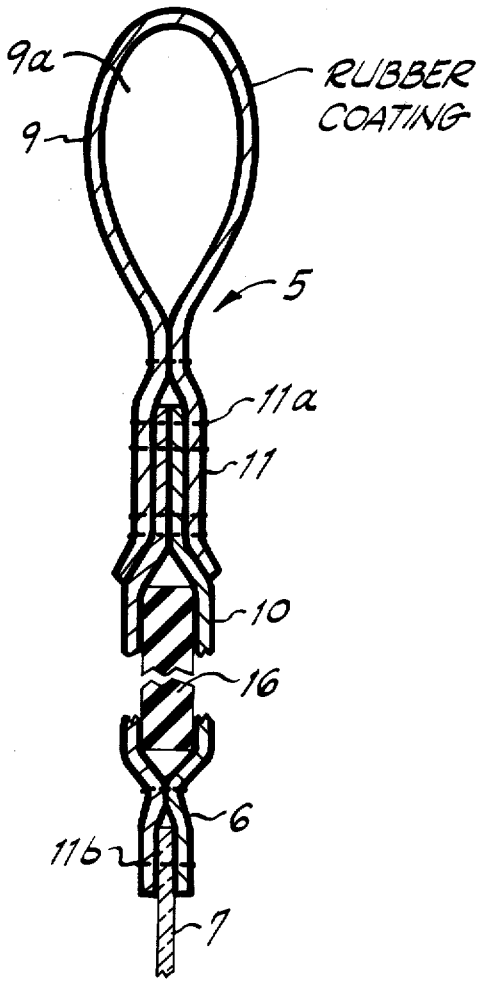
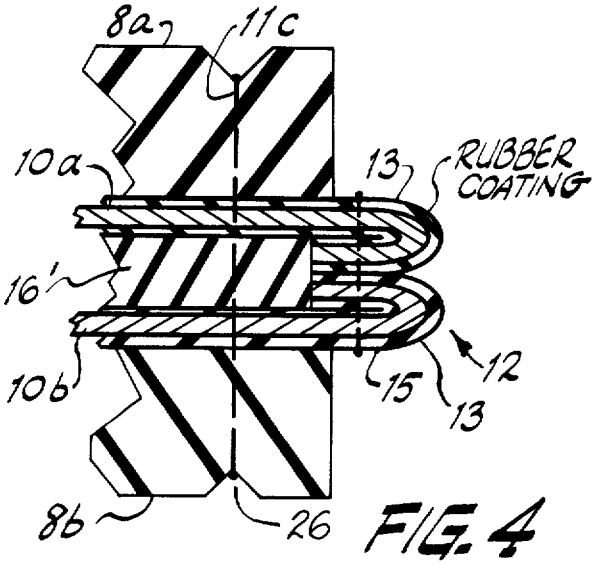
FIG. 4

13y
27d
13z
14y
13x
30c
38b
39
27b
40
41
30a
38a
32
27c
36a
36b
30b
33
31a
34
6
6
27a
36c
36d
31b
29
28
48
49a
36e
36f
36g
49b
35
42
47'b
46b
47'a
7x
14x
46a
45a
47a
37
5x
5y
5z
43

REFRIGERATION INSULATION PANEL AND STRUCTURE

Matter enclosed in heavy brackets [ ] appears in the original patent but forms no part of this reissue specification; matter printed in italics indicates the additions made by reissue.

This invention relates to novel refrigeration insulation panels and structures built therefrom.

BACKGROUND TO THE INVENTION

Various industries often require supplementary doors, room separators, vestibles or baffles to isolate one area from another. Such devices serve to reduce or eliminate the introduction of adverse temperatures, humidity drafts or polluted air in the form of dust or contaminents into an adjacent area. Undesirable levels of sound can also be reduced or isolated. In some cases separation of areas for reasons of asthetics would apply. Industries involved in the handling of meats, poultry, fish, produce, dairy, ice cream, freeze drying, warehousing, ice making, manufacturing, etc., requiring refrigerated rooms for cooling or freezing, have a need for these products, for example. This includes all levels of a specific industry from basic processing to distribution to the retailer.

Examples of typical use are as follow.

Refrigerator or freezer doors are often opened many times in the course of any work shift. This imposes heat loads on refrigeration equipment and effects room temperature levels. It can also create icing conditions as a result of the introduction of warmer moist air into freezer rooms that can create undesirable icing on products, refrigeration equipment, rack systems, ceilings or floors. In the latter case, it operates a safety hazard to passing fork trucks and/or personnel on foot. Product spoilage can also be a resulting factor.

All of these problems can cost the owner money in the form of wasted energy or liability.

Supplementary double-acting doors or curtains placed in the same opening behind refrigerator or freezer doors greatly reduce all of the above mentioned problems. They serve to constantly keep the refrigerated room separated from the areas of different temperatures and humidity even though they do not offer as good a seal or insulation value as the main doors. The main doors are needed to close off these areas at night, weekends, holidays or during slow production periods. The supplementary doors do their job when traffic is heavy and main doors are constantly left open or are opened and closed frequently. The supplementary door closes automatically by means of mechanical devices.

The same principle is needed to be elaborated on for more efficient insulation which as a part of the present invention shall be later elaborated on with regard to air lock tunnels.

When the environmental conditions are not as critical on either side of a door opening, supplementary type doors can serve as the main or only door in the opening.

Supplementary doors can serve also to contain cool air in air conditioned buildings and/or warm air in heated buildings.

Supplementary doors are used to separate washdown or clean-up rooms from processing areas in food plants.

A need exists to separate volatile dusts or gases from areas where they could be accidentally ignited if permitted to form in heavy concentrations.

Kosher products are required to be separated from non-kosher products.

Machinery or other sound devices can be separated from areas where hearing could be effected or harmed.

Temporary room dividers can be erected or removed at will to satisfy seasonal production or storage requirements where a single room is desired to be temporarily separated into smaller areas of different temperatures and later returned to the same temperature.

Curtain baffles can serve to deflect controlled temperature areas to where it is needed most, increasing efficiency and reducing waste.

Curing rooms requiring moderate heat, but not requiring absolute seals, utilize supplementary doors.

Where products such as meats are processed, retention of high humidities are desired to prevent loss of moisture in the meat that results in weight loss in the raw meats.

The broad concept of supplementary doors, room separators, and vestibules or baffles, is not new.

SUMMARY OF THE INVENTION

Accordingly, objects of the present invention include the overcoming and/or avoiding of difficulties and disadvantages of the types described above, together with obtaining of novel advantages.

In particular, an additional object is to obtain a novel insulation panel having improved physical properties in so far as durability, insulation, and adaptability to the diverse needs above-noted.

Another object is to obtain flexible partitions adaptable as either or both temporary and/or permanent dividers, doors, or area partitions of the types discussed above.

Another object is to obtain improved sanitation associated with temporary partitions utilizable in food or other areas which require a high degree of cleanliness to be obtained and maintained during use, including ease of and thoroughness of cleaning the same.

Another object is to obtain improved protective bumper or kick-plate structure associated with such door panels, including improved protections against wear and tear on and breakage of attaching threads by which such plates or strips are mounted, thereby providing for improved and longer-lasting durability.

Another object is to obtain improved efficiency in insulation of cold air from warm and/or humid air, for insulation panels and temporary doors.

Another object is to obtain a novel flexible temporary door and/or permanent divider suspended door or panel adaptable for to repeated and continuous to and fro travel of personnel and/or freight fork trucks, carts, or the like.

Another object is to obtain a novel tunnel or vestibule or air lock structure for confining undesirable icing, that can be removed as required if desired, by dehumidification or supplemental refrigeration equipment that can be added in the tunnel to eliminate this problem, or which novel structure is adaptable to serve to connect trucks or rail cars to buildings of similar temperatures and/or humidities, or the like.

Another object is to obtain novel supports for and as a part of said above-noted panels, doors and tunnels, and the like.

Other objects become apparent from the preceding and following disclosure.

One or more objects are obtained by the invention as disclosed herein, including the accompanying drawings which are intended to improve understanding by the illustration of preferred embodiments and typical embodiments, but which are not intended to unduly limit the invention which includes variations and modifications and substitution of equivalents as and to the extent that would be obvious to a person or ordinary skill in this art.

Broadly the invention may be described as a refrigeration insulation panel combination which includes novel function and properties as a result of the combined particular elements thereof, as follow. There is an elongated flexible sheet having a toughness sufficient to withstand major impacts without puncturing or tearing, such as from impacts by fork trucks or tractors or push-carts or the like on which merchandise or products are loaded on slammed against in the process of moving past or pushing-aside the flexible sheet. There are utilized two such flexible sheets, at least, in the form of a sandwich, sandwiching therebetween a layer of rubber in the form of a rubber sheet, all anchored or bound together such as by sewing through all layers thereof. In further preferred embodiments of this broad embodiment of the sandwiched and sandwiching sheets, the sandwiching flexible sheets are composed of Nylon fabric having a surface coating of rubber, preferably synthetic rubber of a tough but flexible nature, and the sandwiched rubber sheet being of closed cell rubber preferably, for improved insulation quality, and no moisture absorption.

In a further preferred embodiment, there is provided a fastening mechanism along an upper end of the sandwiched flexible sheets, typically of elongated shapes such as the shape of a door extending from top to bottom thereof. Preferably the fastening mechanism, adapted to attach the sandwiched flexible sheet at an upper end thereof to thereby suspend the same as a hanging flexible flap-door which may be temporily pushed aside or upwardly by advancing personnel or vehicle(s), is composed of the same type of rubber-coated flexible sheet fabric in the nature of a strip folded-over upon itself with lower edges thereof sandwiching therebetween the upper end of the sandwiched flexible sheet or above-described panel, and sewn thereto forming—by the fold-over—a through-channel through which a support-bar may be inserted; likewise, for a door panel to be swung in lateral to and fro directions as from a hinge on or at the side, there is likewise provided an additional fastening mechanism and structure at the upper side edge extending uprightly along that side edge and forming an upright channel receivable of an upright bar, the horizontal and upright suspending bars being a further preferred embodiment and preferably being horizontal and vertical legs of a common right-angle bar structure, the vertical or upright leg extending through and being attached to a biasing spring biasing the door panel to a centered or closed position normally, when the spring structure is mounted on a preferred support as follows.

In a preferred further embodiment, a typically u-shaped support bar has wall-mounting mechanism and structure at opposite ends thereof, and preferably downwardly-extending support upright bars at each of the u-bend corners, or thereabout, providing support upright bar support for the above-described door hinges. The side legs of the u-shaped support bar provide support structure for each of roof and opposite tunnel sides downwarly hanging therefrom, typically through cut-loop structure slits therein, or other appropriate and/or conventional attaching mechanism. In a further preferred embodiment, the u-shaped support bar has attaching rings or the like at each of the u-shaped corners or bends so as to provide for attaching thereto easily supporting cables to extend upwardly backward toward the supporting wall, or alternately upwardly to a supporting ceiling.

In a further embodiment for door embodiments—either of temporary or permanent separation, preferably there is provided in the face of the door panel of above-described sandwiched flexible sheets, a plastic window transparent structure positioned such that personnel or fork truck drivers or the like moving to and fro may view the opposite side to determine whether any possibility of collision exists. In like manner, preferably in this window-preferred embodiment, the edges of the window are sandwiched between edges of the sandwiching flexible sheets of rubber coated Nylon, rpoviding a good as well as sturdy seal, stitched with preferably Nylon thread.

In a further preferred embodiment of the temporary and/or permanent-divider door panels of the types described already-above, there is provided preferably a bumper or kick guard sheet or strip preferably composed of thick Nylon fabric coated with a thick coating of polyvinylchloride plastic composition providing a high degree and level of toughness, together with flexibility. This sheet is sewn preferably to a face of a typically lower-half of each side of the panel door of sandwiched flexible sheets, by preferably Nylon thread; the exposed (exterior) face of the bumper or kick guard sheet or strip has spaced-away from the edge thereof and following the circumscribing edge thereof, preferably a cut-out groove into which the sewn threads are recessed, thereby providing protection of the sewn threads against wear and tear and breakage of the threads, adding thereby life and durability to the bumper or kick guard, and to the door panel combination as a whole.

The invention may be better understood by making reference to the following Figures.

THE FIGURES AND DETAILED DESCRIPTION

FIG. 1 illustrates an elevation plan view of a side face of a typical insulation panel of the present invention.

FIG. 3 illustrates a cross-sectional and in-part view as taken along lines 3—3 of FIG. 1.

FIG. 4 illustrates a cross-sectional in-part view as taken along line 4—4 of FIG. 1.

Figure 2:
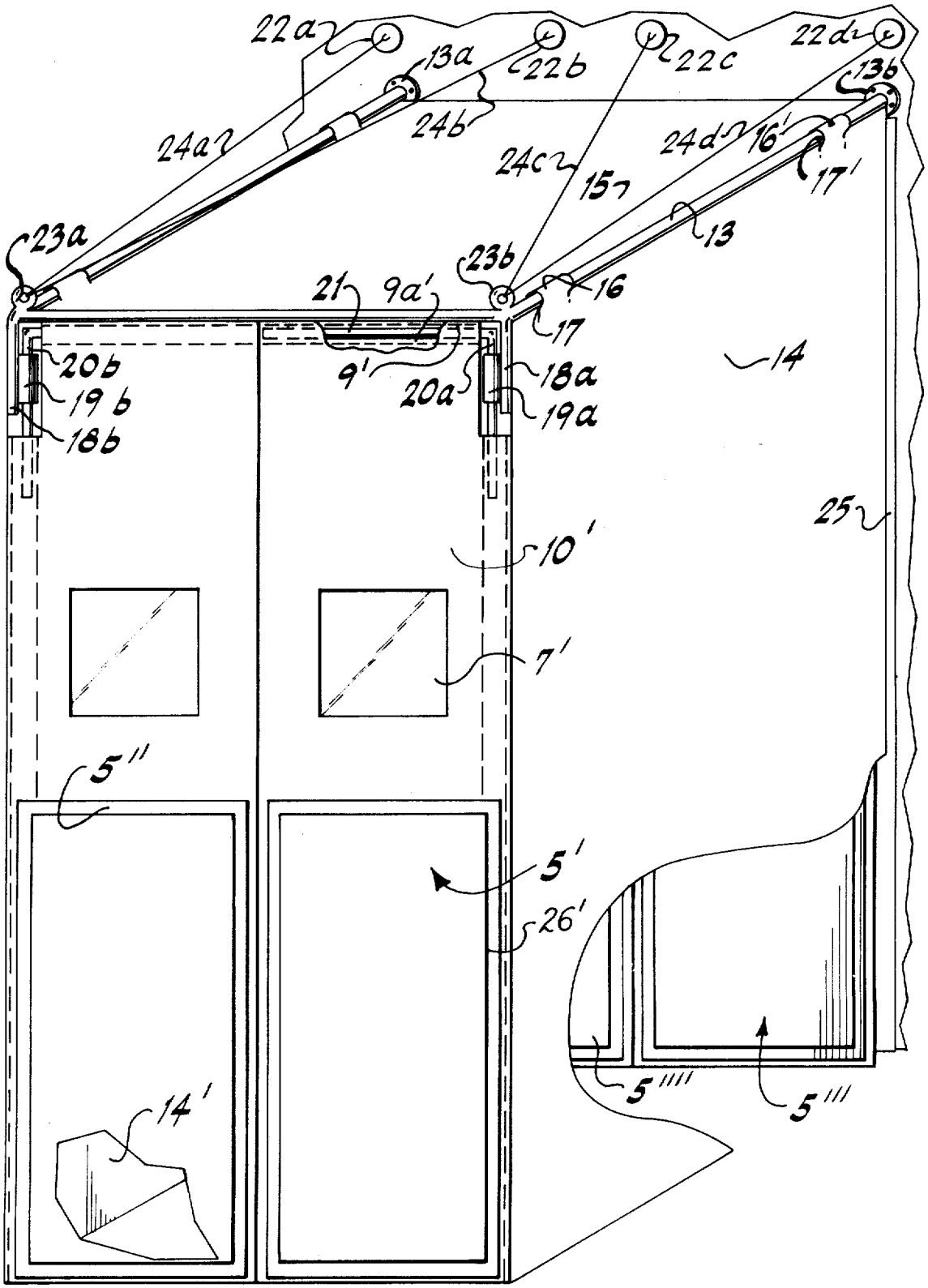
FIG. 2 illustrates a perspective view of a preferred air-lock tunnel structure having suspended swinging doors, all walls, roof and doors at each of opposite ends being of the novel panels of the invention.

FIGS. 1, 3, and 4 relate to a common embodiment, and the construction of the elements of FIG. 2 are identical to that of FIGS. 1, 3 and 4 for common elements thereof.

The above-noted principle of supplementary double-acting doors or curtains can be elaborated upon by providing long tunnels or vesticules—above-referred to as an air-lock—with supplementary doors provided at either end through which personnel or fork lift trucks pass in and out of the refrigerated areas. The tunnel or vestibule can help confine undesirable icing that can be removed as required by dehumidification or supplementary refrigeration equipment that can be added in the tunnel to eliminate this problem. A similar design serves to connect trucks or rail cars to buildings of similar temperatures.

While there are numerous preferred embodiments having novel features and advantages for the basic panel structure, it is also believed that the concept of total flexibility together with essential other elements such as see-through windows, superior insulation properties, high durability, and the like, is new, such clearly not heretofore having been available commercially, as known first hand by the present inventors who are marketers in this area.

The basic structure and method of assemblying of the novel panels of the present invention, includes the placing of an insulation, vapor barrier and impact-absorbing inner core in sandwich fashion between outer layers of tough fabrics. The rubber can be any thickness depending upon temperature requirements or other special specification needs. The double layer fabrics can be of varying weights and or material make-up, on each of both sides of the panel, typically a door panel. Usage again determines the choice and weight of fabrics to be used. Assemblage of the panels is accomplished by sewing with heavy thread and reinforcing rivets to complete the sandwich of rubber and fabric. Flexible windows of optional sizes are installed in the upper half of each door panel when specified. Rubber is omitted and clear flexible vinyl window material is instead sewn between the fabric layers, in a preferred embodiment. A flexible kickplating or bumper strip or panel, each term referring to the same structural element, is, when required, sewn to either layer of fabric providing a separate plate to each side of each door for the door's lower half, with rubber sandwiched in-between. The kickplates are preferably grooved at the sides and bottom for recessing of attaching stitch lines, providing thereby protection against wear and tear and breakage of threads by impacting fork trucks, tractors, or the like. The top of the kickplate is cut and sewn in a special way so as to create a sanitary seam for use in industry where high degrees of sanitary conditions are required. As noted, such kickplates provide for additional abuse protection. Standard kickplates typically are 42 inches high from bottom of the door and indented from center and heal flaps; they are completely flexible typically one-eighth inch thick nylon reinforced polyvinylchloride material and meet with U.S.D.A. approvals. Each kickplate typically has duel grooved cut-outs at the sides and bottom, as noted above, to permit recessed nylon twist stitching for attachment of the plate to the door panel. The top of the kickplate shall be inserted in a special recess provided in the base door panel so as to form a sanitary flap over the top of the kickplate. A horizontally-extending overflap preferably is secured with dual stitch lines to the kickplate. Also, to add necessary sturdiness, rivits and burrs are used at corners and other select locations for additional reinforcement.

Each door support are preferably is a one-piece heavy steel flat bar heat-bent to a 90 degree angle so as to fit in the upper corner of the jamb. The close profile of the support arm to the side and head jamb is designed to keep it out of the way of fork lift truck traffic. Preferably, no diagonal supports are used, and the support are preferably is of sufficient strength and design that the spring loaded hinge assembly will open in the direction force is applied before the bar will bend. Each support arm preferably is bolted to a double-acting spring loaded hinge assembly. The hinge(s) each preferably has two springs per hinge, each having its own tension adjustment, and each support arm preferably has a jamb stop for door alignment and hinge tension adjustment. Also preferably the support arms and hardware, including the support frame for a tunnel structure, have anticorrosive protective coatings of conventional nature.

Design differences other than described above for doors, flexible walls, tunnels, etc., vary only in the type of hardware utilized. Grommets may be installed for hook or cable attachment. Flaps for support arms are preferably used on door panels. Other special hardward or fabric attachments are used when special usages so dictate. Gaskets and/or hinges can be attached, as above-noted, when door panels are used in conjunction with power operators. For example, door panels may be hung from single or bi-parting manual or electrically operated horizontal sliding doors.

Cushion-type doors of the above-general construction, are preferably one-fourth inch thick core material, but where thermal or superior thermal insulation is desired or needed, the door has preferably one inch thick core material. The core material is preferably low density synthetic rubber polymer 100% E.P.D.M. having a maximum density of 4 pounds per cubic foot and an ASTM cold crack rating of −100 degrees Fahrenheit. Ozone resistance is typically zero per ASTM-D-1171 and water absorption 1% maximum per ASTM-D-1056. The core material shall have typically a constant K factor of 0.25 at 75 degrees Fahrenheit. Fungas inhibotors of conventional or desired types are preferably added to core material so as to show zero fungus growth after 30 days at 85 percent RH. Outer exposed surfaces of the door panels preferably have 32 oz. U.S.-D.A.-approved Hypalon (TM) fabric on either side of the core material, the Hypalon consisting of double layers of nylon-coated with special formula synthetic rubber on sides of the nylon layers. Grab tensile strength pounds per inch preferably is 1000×800 and Mullery and Hydrostatic, lbs. per sq. inch is preferably 1000(+). Low temperature resistance is preferably −40 degrees Fahrenheit.

Door panels are preferably joined by means of heavy nylon twist recessed stitching and non-rusting rivits and burrs. Where cover fabrics are joined at the leading edges, layers are preferably turned-in so as to form four layers of fabric for additional strength and to present smooth finished turned-in edges being more sanitary to avoid collecting filth, as well as being stronger and aesthetically a finer-appearing product also. The heal of each door preferably has a cover flap extending the full height of the door leaf. All stitch lines are preferably straight so as to present not only a good appearance, but a resulting improved high strength and durability. Stitch lines are preferably with ¼ inch of the door's edge. Each front and back door panel preferably is made from one-piece fabric, multiple sections not being acceptable for purposes of this invention because of decreased durability and increased opportunities for accumulating filth when multiple pieces, as well as multiple pieces decreasing sealing, especially as wear and tear over extended usage tears-apart the multi-piece sections from one-another.

For the door windows above-discussed; the window size is preferably 3/32 inch thick clear flexible vinyl, sewn between front and back door panels.

With reference to FIGS. 1, 3 and 4, the various elements illustrated are as follow.

There is shown a fastening mechanism including a folded-over fabric 9 having folded-over edges 11 thereof secured over upper edges of the sandwiched sheets 10 and secured by stitching 11a through the thus four-layer thickness, providing enhanced durability and sturdiness. The insulation rubber sheet 16 is enclosed in sandwich fashion between the sandwiched sheets 10, and adjacent the transparent flexible plastic window 7 the sandwiched sheets 10 sandwich peripheral edges of the window at 6, secured by stitching 11b. A lower half 12 of the flexible door panel 5, has mounted thereon each of opposite faces of the panel, the bumper or kick-plate panel (sheet), identified as 8a and 8b respectively. Another rubber insulation sheet 16' is shown sandwiched between lower sheet-portions 10a and 10b, with free edges thereof turned-under as reinforced edges 13 secured by stitching 15. The kickplates (bumperplates) 8a and 8b are secured by through-stitching 11c stitched in recessed manner in stitch cut-out grooves 26,26'. The suspending bar will be mounted through channel 9a of the folded-over fabric 9.

The FIG. 2 tunnel walls 14 and 14', and the roof 15 are a continuous fabric in this preferred embodiment, providing added sealing and resulting insulation, together with ease of mounting on the U-shaped mounting bar 13 mounted by wall-mounts 13a and 13b. The fabric wall and roof paneling is mounted by slit-fabric loops 16 and 16' through slits 17 and 17' thereof. The roof and side panels and the door panels 5' and 5'' and 5''' and 5'''' are all structured the same as above-described, in-so-far-as common elements are concerned. The wall-mounted end of the tunnel is supported flushly with the door jamb 25, in this preferred illustrated embodiment. The U-shaped mounting bar 13 has support rings 23a and 23b with supporting wall mounts 22a, 22b, 22c, and 22d, and interconnecting supporting cables 24a, 24b, 24c, and 24d respectively. The U-shaped mounting bar 13 has corned downwardly-extending projections 18a and 18b onto which are mounted spring hinge units 19a and 19b which contain preferably (not illustrated) desired or conventional double biasing springs, for biasing from opposite-swing directions toward the illustrated middle centered closed-door positions. The same is true for the opposite end door panels 15''' and 15''''. Each door panel of this embodiment, is mounted on right-angle bars 20a and 20b having fastening structure 9' forming a through channel 9a' through which horizontal leg 21 extends and supports the panel door 5', for example. Vertical leg 21' is mounted operatively within the hinge unit 19a, for example.

Together with noted objects and apparent advantages of the various embodiments of the present invention, there are the advantages of being easy to install, easy to maintain, high efficiency as well as adaptability to the particular need, toughness resulting from both nature of component elements and nature of assemblage, "total" flexibility of the panel structures, thereby avoiding undue impacts or damage therefrom as a result of the flexibility thereof. Also, size is easily adapted to the particular need of a customer without major change in overall design. The closed-cell rubber obtains superior insulation for temperature insulation. And, equally important with the multiple advantages is the combined simplicity of construction and parts together with the low cost of manufacture and parts, and resulting sales prices, thereby making available the advantages to a large public not eliminated by price. The U-shaped mounting bar mountable on the wall, advantageously eliminates the need for floor supports which would complicate matters such as being subject to being struck by fork lift trucks and the like, and accordingly being in the way, as well as—unless secured to the floor (usually a problem)—being less stably mounted against shaking or falling in response to continuous shocks as the swing-doors are struck and swing to and fro, and the like. Likewise, the free-hanging roof and side wall panels do not require complicated building or mounting structures nor procedures.

Figure 5:
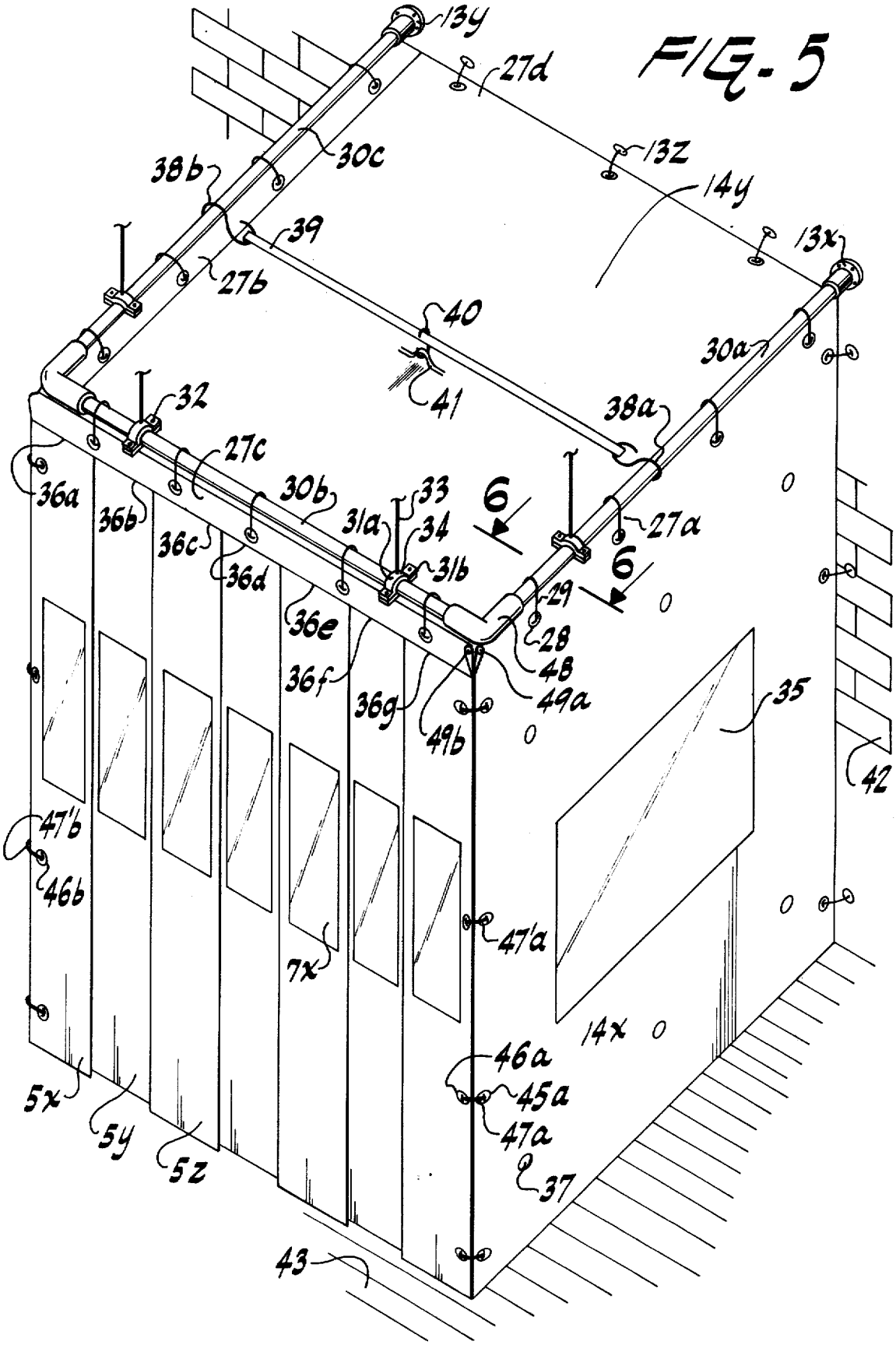
FIGS. 5 and 6 illustrate perspective and section of another embodiment.
Figure 6:
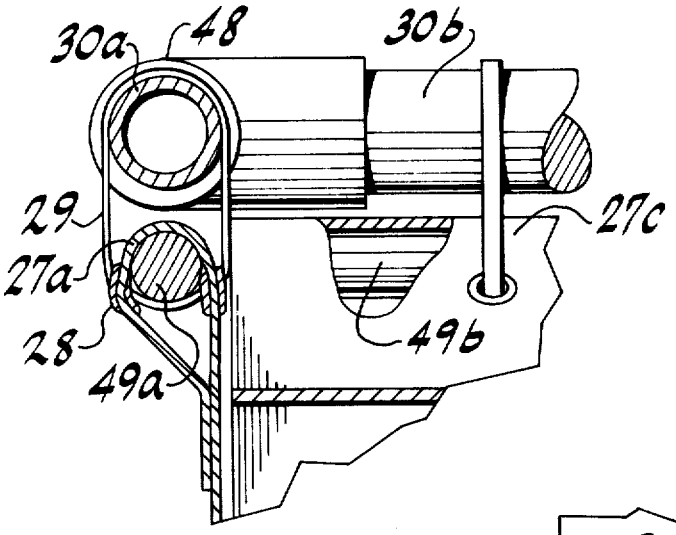

FIGS. 5 through 6 disclose an alternate preferred embodiment, for the tunnel system and unit. Parts thereof corresponding to elements previously identified are correspondingly commonly labeled, requiring no further explanation. Accordingly, in this embodiment, wall panel 14x has window 35 and is sewn to and thus continuous with top panel 14y, with attached supporting through-channel strip 27a having bar 49a mounted therein and supported through eyelets 28 by support cords 29 suspended from mounting bar 30a which is mounted on the wall at 13x and is further supported by bracket elements 31a and 31b and bolts 32 suspended from a ceiling support by lines 33, attached at points 34. The free-hanging strip-panels 5x, 5y, 5z, and the like all are attached at and to hand from points 36a through 36g onto strip 27c; note that alternate ones of the strip-panels 5x, 5y, 5z, etc. overlap one-another so as to provide an improved seal of the tunnel's interior space. Inner and outer fabrics of the wall panel 14y are reinforced by brad-like elements 37. The top or roof panel 14y is supported against centrally sagging by the hook elements 38a and 38b suspendingly mounting on and between bars 30a and 30b the elastic member 39. Hook 40 is suspended from the elastic member 39, and is hooked into catch member 41 mounted on the top panel 14y. The bars 30a and 30b are corner mounted conventionally by female corner tubes 48. The lateral-most of the suspended door panels such as door panel 5x, are preferably anchored to the side wall panel such as side wall panel 14x, by anchor cords 47'a and 47'b threaded through appropriate eyelets such as 45a and 46a.

The FIG. 6 is taken along lines 6—6 of FIG. 5 and further discloses details already discussed above.

Figure 7:
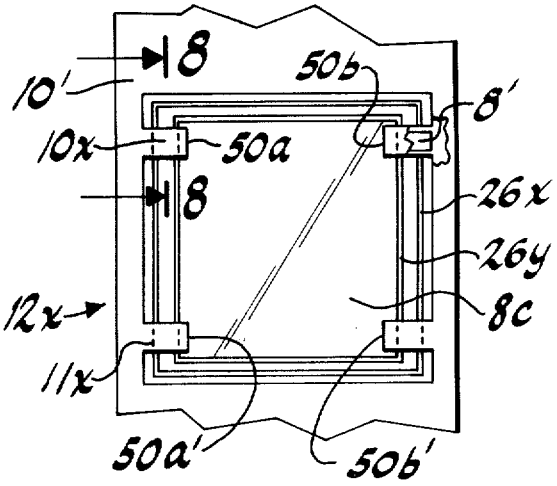
FIGS. 7 and 8 illustrate a bumper-plate mounting in plan and section respectively.
Figure 8:
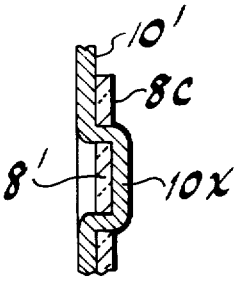

FIG. 7 illustrates a preferred door panel and mechanism of mounting the bumper(kicker) plate thereto. The bumper plate has parallel slits spaced-apart a short distance, thereby forming a tab, and the door panel surface material has a slit extending transversely to the tab for a distance of the tab's width; the tabs are mounted within the rexpective slits at the top and bottom on each of opposite sides of the bumper plate, and thereupon the entire border is sewn within the recessed portion previously identified as a groove, all-around and including also on the overlapping fabric adjacent each slit; the overlapping relationship is best seen in the 8—8 section of the FIG. 8, with reference to FIG. 7. Thus, the door panel fabric 10x has slit 50a with bumper plate tabs such as tab 8' inserted therein, and sew-lines (thread) 11x, for example. Thus an improved and sturdy mount is achieved.

Figure 9:
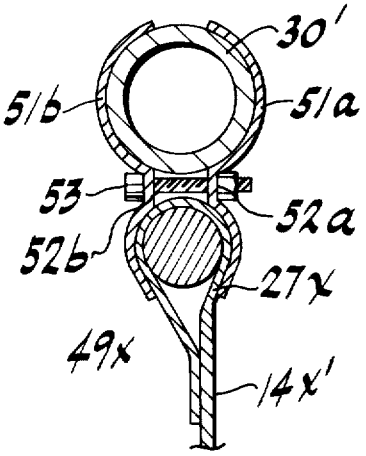
FIG. 9 is an alternate clamp.

FIG. 9 illustrates an alternate and preferred clamping combination and structure illustratively shown supporting a tunnel wall strip 27x of tunnel wall 14x' and bar 49x and support 30' and the like. The clamping combination includes the opposing cup-clamps 51a and 51b, secured through their respective apertures 52a and 52b by bolt 53.

It is to be understood that the present figures are intended to merely illustrate preferred embodiments in order to facilitate improved understanding and are accordingly not intended to unduly limit the invention to those illustrated embodiments, but rather the present invention includes variations and modifications and substitution of equivalents within the skill of an ordinary artisan in this art.

Typical prior art includes U.S. Pat. No. 3,146,826 of which a wooden door member extends from top to bottom of the door permanently mounted in the door jamb, the majority of the body of the door being of non-resilient laminated sheets. U.S. Pat. No. 3,858,357 has a hinge-mounting structure anchored to the door throughout the length or height of the door constituting solely the lower-half being of rubber of a single layer as the total thickness of the door, the whole upper one-half being clear plastic—nowhere stated to be flexible. It is supported by the large cumbersome hinge-mounting structure, with solely an intermediate bumber. U.S. Pat. No. 3,420,290 has a door of opposite upright edges of wood or metal, with sandwiched non-resilient blocks between sandwiching rubber sheets. Other patents showing substantially the same as those discussed above are U.S. Pat. Nos. 3,797,165 and 3,811,222 and 3,854,263.

We claim:

1. A refrigeration insulation panel device comprising in combination: a first set of at least two elongated flexible sheets have predetermined toughness sufficient to withstand major impacts without puncturing or tearing, each flexible sheet having opposite substantially planar side faces, said two flexible sheets being aligned and sandwiched with each flexible sheet having one of its planar side faces in opposed and parallel relationship to the other sheet's planar side face; an insulation rubber sheet being sandwiched and anchored between the opposed planar side faces, said insulation rubber sheet being closed-cell rubber, and said flexible sheets each comprising Nylon fabric coated with synthetic rubber, and including a flexible bumper strip attached to and suspended downwardly at said lower end; and a flexible bumper strip attached to and suspended downwardly at said lower end, the flexible bumper strip being mounted on top of an exposed exterior one of said planar side faces on each of said sandwiched flexible sheets covering substantially a lower half of said one of said planar side faces, an exposed side planar face of said flexible bumper strip having a cut-groove spaced from and following the circumscribing edge thereof, said flexible bumper strip being attached to said one of said planar faces by stitching recessed within said cut-groove adapted such that impacting objects onto said exposed side planar face of said flexible bumper strip, is protected against wear and breakage by impact from the impacting objects.

2. A refrigeration insulation panel device of claim 1, including a flexible plastic sheet attached to edges of said sandwiched flexible sheets, adapted to serve as a see-through window.

3. A refrigeration insulation panel device of claim 1, in which edges of said sandwiched flexible sheets extend beyond edges of the insulation rubber sheet sandwiched therebetween, and portions of said sandwiched flexible sheets' edges are turned-under and sewn together adapted such that sewing thread extend through four thicknesses thereof whereby substantial tear strength is added thereto such that the sandwiched flexible sheets are increased in durability against impact of impacting objects.

4. A refrigeration insulation panel device of claim 1, in which a flexible transparent plastic sheet is attached to edges of said sandwiched flexible sheets, adapted to serve as a see-through window.

5. A refrigeration insulation panel device of claim 1, in which said flexible bumper strip comprises comprises Nylon fabric of predetermined major thickness sufficient to absorb substantial amounts of impact, said Nylon fabric of said flexible bumper strip being reinforced with a layer of polyvinylchloride.

6. A refrigeration insulation panel device comprising in combination: a first set of at least two elongated flexible sheets having predetermined toughness sufficient to withstand major impacts without puncturing or tearing, each flexible sheet having opposite substantially planar side faces, said two flexible sheets being aligned and sandwiched with each flexible sheet having one of its planar side faces in opposed and parallel relationships to the other sheet's planar side face, the sandwiched flexible sheets having upper and lower ends; and fastening means attached along said upper end for suspending the sandwiched flexible sheets from an overhead support structure; and an insulation rubber sheet sandwiched and anchored between the opposed planar side faces, including additional ones of said sandwiched flexible sheets having joined edges and positioned to form a tunnel having a roof and upright sidewalls and said fastening means being attached to at least one of said side wall.

7. A refrigeration insulation panel device of claim 6, including a flexible bumper strip attached to and suspended downwardly at said lower end.

8. A refrigeration insulation panel device of claim 6, including a flexible transparent plastic sheet attached to edges of said sandwiched flexible sheets, adapted to serve as a see-through window.

9. A refrigeration insulation panel device of claim 4, including additional ones of said sandwiched flexible sheets having joined edges and positioned to form a tunnel having a roof and upright sidewalls, and said fastening means being attached to at least one of said roof and sidewalls.

10. A refrigeration insulation panel device of claim 6, in which said flexible sheets each comprise Nylon fabric coated with rubber.

11. A refrigeration insulation panel device of claim 10, in which said rubber coated on said Nylon fabric is synthetic rubber.

12. A refrigeration insulation panel device of claim 7, in which said flexible bumper strip is mounted on top of an exposed exterior one of said planar side faces on each of said sandwiched flexible sheets covering substantially a lower half of said one of said planar side faces.

13. A refrigeration insulation panel device of claim 12, in which an exposed side planar face of said flexible bumper strip has a cut-groove spaced from and following the circumscribing edge thereof, and said flexible bumper strip being attached to said one of said planar faces by stitching recessed within said cut-groove adapted such that impacting objects impacting onto said exposed side planar face of said flexible bumper strip, is protected against wear and breakage by impact from the impacting objects.

14. A refrigeration insulation panel device of claim 6, in which said fastening means comprises a length of strip material turned-over upon itself and having between lower edge opposing faces thereof said upper end sandwitched therebetween, anchored by stitching and by stud elements adapted thereby to provide high durability and strength, said turnedover strip material thereby forming a open-ended channel open at each of opposite ends of the open-ended channel and thereby receivable therethrough of a support bar.

15. A refrigeration insulation panel device of claim 14, in which an additional one of said fastening means is positioned uprightly along a mounting upright edge of said sandwiched flexible sheets.

16. A refrigeration insulation panel device of claim 15, and a right-angle support structure having a horizontal leg and an upright leg, the horizontal leg being mounted through a channel of the attaching means at the upper end of the sandwiched flexible sheets, and the upright leg being mounted through a channel of the attaching means positioned uprightly, adapted such that said right-angle support structure is mountable as a support structure and as a swing hinge.

17. A refrigeration insulation panel device of claim 16, including a supporting brace extending uprightly with a hinge means thereon including a spring adapted to bias to and fro a mounted door to a central closed-door position, said hinge means mounting said right-angle support structure by said upright leg extending through and being operatively connected to said hinge means.

18. A refrigeration insulation panel device of claim 7, in which said flexible bumper strip comprises Nylon fabric of predetermined major thickness sufficient to absorb substantial amounts of impact, said Nylon fabric of said flexible bumper strip being reinforced with a layer of polyvinyl chloride.

19. A refrigeration insulation panel device of claim 7, in which said lower end includes slit-openings and in which the flexible bumper strip includes slits therein forming insertion-tabs, and one of said insertion-tabs being inserted into one of said slits for each of said insertion-tabs and of said slits, whereby the bumper strip is mounted onto said lower end.

20. A refrigeration insulation panel device of claim 19, including stitching through said lower end and said bumper strip across said tabs.

21. A refrigeration insulation panel device of claim 17, in which said supporting brace is mountable on and suspendable from a face of an upright rigid wall in juxtaposition to a door jamb, and including additional ones of said sandwiched flexible sheets having joined edges and positioned to form a tunnel having a roof and upright sidewalls all mounted by said fastening means to said supporting brace.

22. A refrigeration insulation panel device comprising in combination: a first set of at least two elongated flexible sheets having predetermined toughness sufficient to withstand major impacts without puncturing or tearing, each flexible sheet having opposite substantially planar side faces, said two flexible sheets being aligned and sandwiched with each flexible sheet having one of its planar side faces in opposed and parallel relationship to the other sheet's planar side face; and fastening means attached along an upper end-portion only of an upright side edge of said sandwiched flexible sheets, for suspending the sandwiched sheets from a laterally positioned support structure; and an insulation rubber sheet sandwiched and anchored between the opposed planar side faces including additional ones of said sandwiched flexible sheets having joined edges and positioned to form a tunnel having a roof and upright sidewalls and said fastening means being attached to at least one of said side wall.

23. A refrigeration insulation panel device of claim 22, including additional ones of said sandwiched flexible sheets having joined edges and positioned to form a tunnel having a roof and upright sidewalls, and said first fastening means suspending an edge of said first set from at least one of said roof and said sidewalls at one of opposite ends of said tunnel.

24. A refrigeration insulation panel device of claim 23, including a second one of said first set, and a second fastening means suspending an edge of said second one from at least one of said roof and said sidewalls at a remaining other one of said opposite ends.

*25. A flexible insulation-strip-panel door comprising (1) a door-jamb-type rigid support element at least partially circumscribing and forming doorway-space located adjacent the rigid support element, the rigid support element being anchored as a support structure, and (2) a free-swinging flexible and bendable panel free of rigid inflexible structure and the free-swinging flexible and bendable panel having sufficient flexibility as to have unsecured portions thereof pushed aside when subjected to a moving impacting object from either direction passing through said doorway-space, said free-swinging flexible and bendable panel being attached to and free-swinging from said rigid support element into said doorway-space, said free-swinging flexible and bendable panel consisting essentially of (a) a first set of at least two elongated flexible resilient fabric sheets having predetermined toughness sufficient to withstand major impacts without puncturing or tearing, each flexible sheet having opposite substantially planar faces, said two flexible sheets each having one of its planar faces in opposed and substantially parallel and spaced-apart relationship to the other sheet's opposing planar side face; and (b) a flexible core consisting essentially of a flexible insulation sheet, said flexible core being sandwiched and anchored between the opposing parallel planar faces, thereby forming said free-swinging flexible and bendable panel; and (c) fastening means flexibly securing the free-swinging flexible and bendable panel in a free-swinging manner onto said rigid support element leaving at-least one unsecured lower corner portion of the free-swinging flexible and bendable panel.*

*26. A flexible insulation-strip-panel door of claim 25, in which said door-jamb-type rigid support element has at-least a portion of its structure located at an elevated overhead location relative to said doorway-space, when in an anchored state, and in which said free-swinging flexible and bendable panel is secured to said overhead portion by said fastening means, with said free-swinging flexible and bendable panel swinging downwardly into said doorway space.*

*27. A flexible insulation-strip-panel door of claim 26, in which a flexible transparent plastic sheet is attached to edges of said sandwiched flexible sheets, adapted to serve as a see-through window.*

*28. A flexible insulation-strip-panel door of claim 27, in which each of said sandwiched flexible sheets is a fabric sheet having a surface coating of synthetic rubber.*

*29. A flexible insulation-strip-panel door of claim 26, in which each of said sandwiched flexible sheets is a Nylon fabric sheet having a surface coating of synthetic rubber.*

*30. A flexible insulation-strip panel door of claim 26, in which said insulation sheet comprises closed-cell rubber.*

* * * * *